United States Patent
Son et al.

(10) Patent No.: US 10,416,398 B2
(45) Date of Patent: Sep. 17, 2019

(54) OPTICAL ASSEMBLY FOR LIGHT TRANSMISSION AND RECEPTION

(71) Applicant: OPTOMIND INC., Suwon-si (KR)

(72) Inventors: Yung-sung Son, Santa Clara, CA (US); Bong-cheol Kim, Seoul (KR); Sang-Shin Lee, Seoul (KR); Yong Geon Lee, Seoul (KR)

(73) Assignee: OPTOMIND INC. (KR)

( * ) Notice: Subject to any disclaimer, the term of this patent is extended or adjusted under 35 U.S.C. 154(b) by 0 days.

(21) Appl. No.: 15/956,987

(22) Filed: Apr. 19, 2018

(65) Prior Publication Data

US 2018/0306985 A1    Oct. 25, 2018

(30) Foreign Application Priority Data

Apr. 19, 2017    (KR) .................. 10-2017-0050280

(51) Int. Cl.
    *G02B 6/42*    (2006.01)
(52) U.S. Cl.
    CPC .......... *G02B 6/423* (2013.01); *G02B 6/4206* (2013.01); *G02B 6/4214* (2013.01); *G02B 6/4246* (2013.01)
(58) Field of Classification Search
    CPC ........ G02B 6/34; G02B 6/423; G02B 6/4231; G02B 6/4204; G02B 6/4214
    USPC .............. 385/31, 33, 36, 47, 88, 89, 92, 93; 398/135, 139
    See application file for complete search history.

(56) References Cited

U.S. PATENT DOCUMENTS

| | | | | |
|---|---|---|---|---|
| 7,063,467 | B2* | 6/2006 | Nagasaka | G02B 6/4214 385/88 |
| 7,547,151 | B2 | 6/2009 | Nagasaka | |
| 8,335,411 | B2* | 12/2012 | Kuznia | G02B 6/4214 385/14 |
| 8,503,884 | B2 | 8/2013 | Lee et al. | |
| 9,140,866 | B2* | 9/2015 | Lee | G02B 6/43 |
| 9,383,530 | B2 | 7/2016 | Ootorii | |
| 9,423,569 | B2 | 8/2016 | Son et al. | |
| 9,470,853 | B2 | 10/2016 | Konishi | |
| 9,482,830 | B2* | 11/2016 | Bhagavatula | G02B 6/32 |
| 9,645,331 | B1* | 5/2017 | Kim | G02B 6/4243 |
| 9,766,416 | B1* | 9/2017 | Kim | G02B 6/32 |

(Continued)

FOREIGN PATENT DOCUMENTS

| | | |
|---|---|---|
| JP | 2008-015348 A | 1/2008 |
| JP | 2014-048640 A | 3/2014 |

(Continued)

OTHER PUBLICATIONS

Non-Final Rejection (Office Action) for Japanese Patent Application No. 2017-119274 dated Jun. 28, 2017 (3 pages) with English Translation (3 pages).

(Continued)

*Primary Examiner* — Robert Tavlykaev
(74) *Attorney, Agent, or Firm* — Harness, Dickey & Pierce, P.L.C.

(57) ABSTRACT

Embodiments of the present disclosure provide an optical assembly for high speed optical communications by combining a cover assembly including a lens and a cover post with a body assembly including a lens, reflection prism and body hole, which takes only a few passive optical alignments for providing aligned optical elements that have required multiple complex and sophisticated processes.

9 Claims, 8 Drawing Sheets

(56) References Cited

U.S. PATENT DOCUMENTS

| | | | |
|---|---|---|---|
| 9,869,830 B2 | 1/2018 | Son et al. | |
| 2010/0284647 A1* | 11/2010 | Stevenson | G02B 6/4204 |
| | | | 385/14 |
| 2012/0177327 A1 | 7/2012 | DeMeritt et al. | |
| 2013/0129281 A1 | 5/2013 | Son et al. | |
| 2013/0266262 A1* | 10/2013 | Nishimura | G02B 6/32 |
| | | | 385/35 |
| 2014/0178002 A1* | 6/2014 | Hung | G02B 6/322 |
| | | | 385/33 |

FOREIGN PATENT DOCUMENTS

| | | |
|---|---|---|
| JP | 2015-161909 A | 9/2015 |
| JP | 2017-501439 A | 1/2017 |
| KR | 10-2010-0037741 A | 4/2010 |
| KR | 20100037741 A | 4/2010 |
| KR | 10-2012-0029673 A | 3/2012 |
| KR | 20120029673 A | 3/2012 |
| KR | 10-2016-0064540 A | 6/2016 |
| KR | 20160064540 A | 6/2016 |
| WO | WO-2012-105354 A1 | 8/2012 |
| WO | WO-2012105354 A1 | 8/2012 |

OTHER PUBLICATIONS

Decision to Grant (Notice of Allowance) for Japanese Patent Application No. 2017-119274 dated Sep. 22, 2017 (3 pages) with English Translation (3 pages).
Japanese Publication Upon Registration for JP 6243568 dated Dec. 6, 2017 (16 pages) with English translation (19 pages).

* cited by examiner

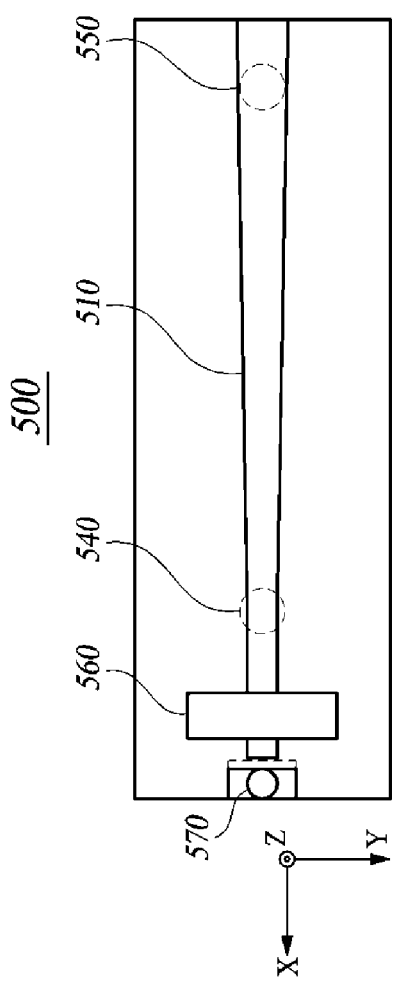
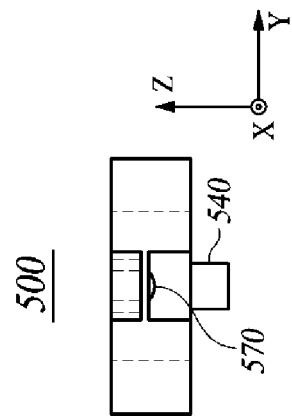
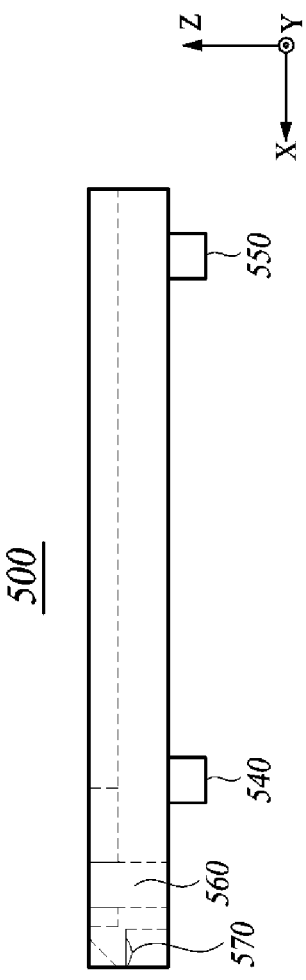
FIG. 5A
FIG. 5B
FIG. 5C

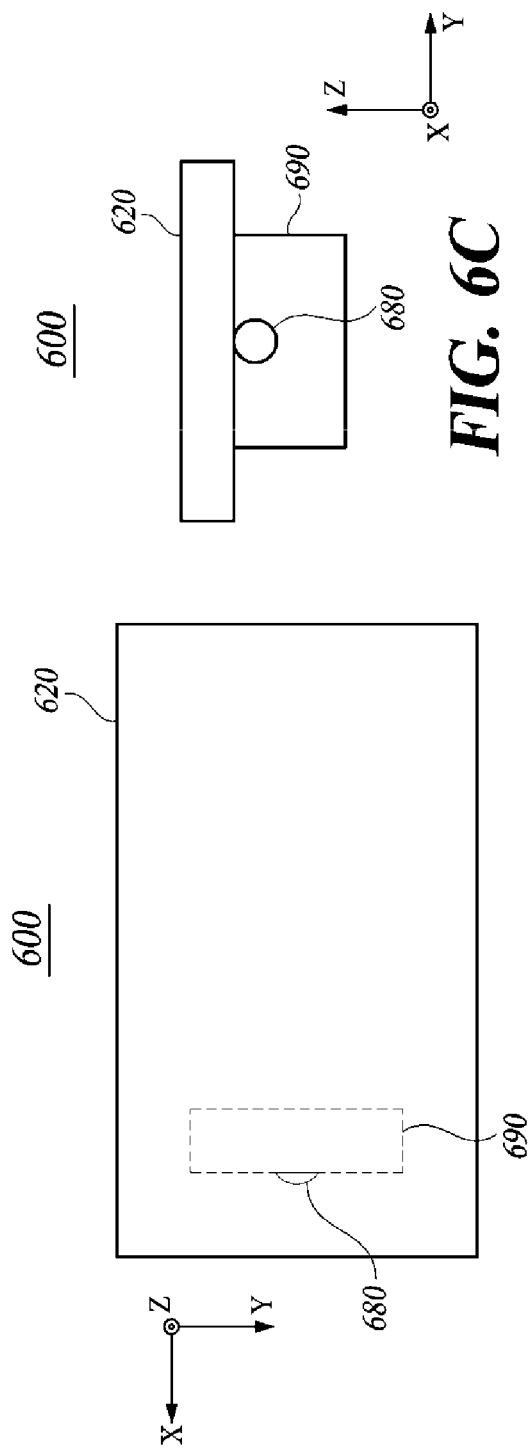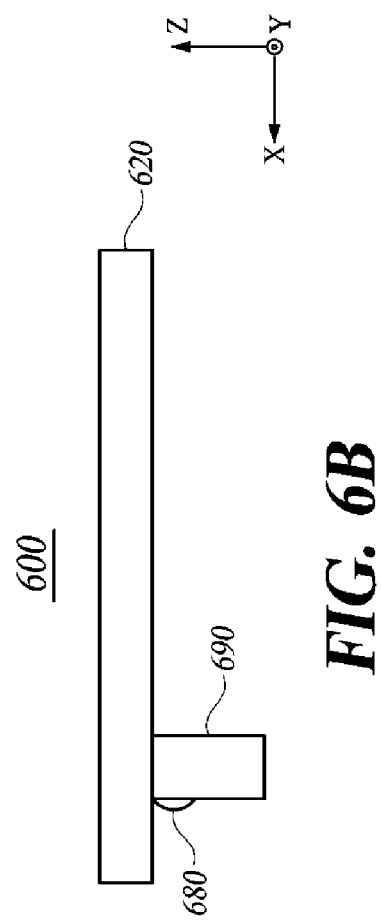

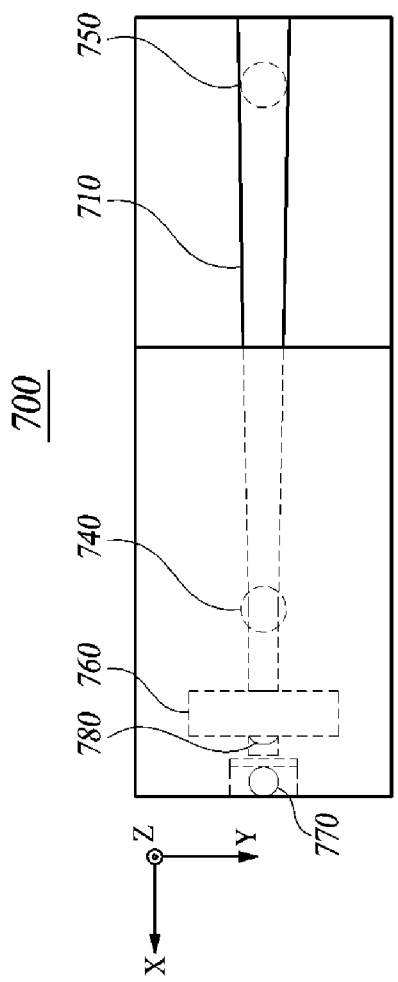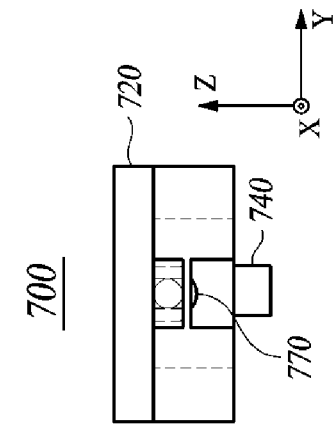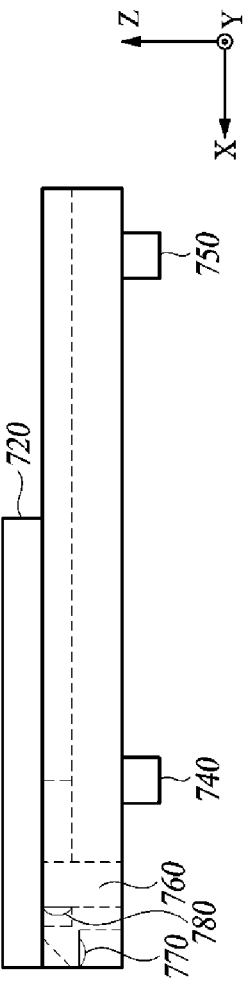
FIG. 7A
FIG. 7B
FIG. 7C

OPTICAL ASSEMBLY FOR LIGHT TRANSMISSION AND RECEPTION

CROSS-REFERENCE TO RELATED APPLICATIONS

The present application is based on, and claims priority from, Korean Patent Application Number 10-2017-0050280, filed Apr. 19, 2017, the disclosure of which is incorporated by reference herein in its entirety.

TECHNICAL FIELD

The present disclosure in some embodiments relates to an optical assembly for light transmission and reception.

BACKGROUND

The statements in this section merely provide background information related to the present disclosure and do not necessarily constitute prior art.

High volume inter-device data transfer demand increases rapidly by, for example, data center, cloud computing, high-performance computing (HPC), ultra-high definition (UHD) and three-dimensional visualization technologies. In addition, a continuous demand for optical interconnection technology for rack-to-rack, board-to-board and chip-to-chip interconnections has stepped up the optical interconnection technology to the practical stage and commercialization stage.

Following this trend, also increasing is the bandwidth of the device-to-device digital interface standards such as InfiniBand, digital visual interface (DVI), high definition multimedia interface (HDMI), DisplayPort (DP), USB 3.0, etc. Further, to increase the bandwidth of the device-to-device digital interface standards, researches are actively carried out on a small multi-channel optical module capable of transmitting a large capacity of information.

Recent smart devices increasingly demand internal optical board-to-board interconnections. Efforts are focused on installing optical modules in smart devices.

However, the optical communication technology in current commercial use is based on long distance data transmission. Most manufacturers of optical communication components and systems simply utilize the long distance optical communication technology for the short range optical communication system or the short distance optical connection with little or no modifications. This results in inefficient products of short range optical communication systems or short distance optical connection solutions from these manufacturers of optical communication components and systems.

Therefore, a cost effective optical connection solution suitable for a short range or short distance optical communication system is necessary.

One of the cost effective optical connection solutions suitable for large capacity data transfer and short distance optical connection is an optical transceiver module that uses vertical-cavity surface-emitting laser (VCSEL) and a vertical-type photodiode.

To establish an optical coupling between an optical fiber and the VCSEL or the vertical-type photodiode, it is typical to make a 90 degree change of the path of light emitted from the VCSEL or of light incident on the vertical-type photodiode. Redirecting the light needs an optical system such as a mirror or a prism, and at least one lens is necessary to enhance the optical coupling efficiency.

FIG. 1 is a conceptual diagram of an optical system included in a conventional optical transceiver.

The optical system used the conventional optical transceiver includes a transmitter collimator lens 120, a transmitter reflection prism 130, a transmitter focusing lens 140, an optical fiber 150, a receiver collimator lens 160, a receiver reflection prism 170, and a receiver focusing lens 180. Here, the optical system has an optical transmitter including the components up to the optical fiber 150 and an optical receiver including the optical fiber 150 and its downstream components.

The light generated and emitted from a light source 110 has a constant radiation angle, is emitted in a direction perpendicular to the surface of the light source 110, and is incident on the transmitter collimator lens 120. The transmitter collimator lens 120 converts light incident from the light source 110 into light beams that travel in parallel to each other. The transmitter reflection prism 130 changes the path of the light emitted from the transmitter collimator lens 120 by 90 degrees to the side where the optical fiber is. The transmitter focusing lens 140 serves to collect the light reflected by the transmitter reflection prism 130 into the optical fiber 150. The light, that is transmitted from the optical fiber 150 and emitted, is incident on the receiver collimator lens 160 which changes the incident light into light beams traveling in parallel to each other. As with the optical transmitter, the receiver reflection prism 170 changes and reflects the path of light by 90 degrees. The light reflected by the receiver reflection prism 170 is made incident on a photodiode 190 via the receiver focusing lens 180, and thereby the optical signal from the optical transmitter finally passes through the optical receiver.

The optical transmitter needs a distance equal to the focal distance between the transmitter focusing lens 140 and the optical fiber 150 for the purpose of the optical coupling between the optical system and the optical fiber. Likewise, the optical receiver needs a length of optical path for forming parallel light beams between the optical fiber 150 and the receiver collimator lens 160. Therefore, a special optical fiber alignment mechanism is indispensable for setting these distances.

With such a conventional optical system, precise measuring instruments are necessary because the light alignment process is required as described above. Additionally, in product production, optical alignment and assembly performances are sensitive to deviation between the optical system mechanism and the optical fiber mechanism, which requires a very precise management of mechanism deviations.

The conventional optical system exposes the optical fiber 150 in the air, which renders the core of the optical fiber 150 to be susceptible to contamination with fine dust and foreign substances. Depending on the severity of the contamination, the optical coupling efficiency may be fatally influenced. In addition, the exposed core of the optical fiber 150 may generate additional optical coupling loss due to Fresnel loss, which can reduce reliability.

In addition, the optical coupling efficiency in the conventional optical system depends on the quality of the cross sectional cut of the optical fiber 150, which requires special processing of the cross section of the optical fiber 150. Unless these issues are resolved, products produced using conventional optical systems are highly likely to cause malfunction or failure. Those products, that are commercialized with these internal deficiencies, are difficult to assemble by using a complete passive alignment method.

By the same token, optical alignment needs elaborate arrangements to be made within a predetermined level of error overall between the light source 110 and the transmitter collimator lens 120, the transmitter collimator lens 120 and the transmitter reflection prism 130, the transmitter reflection prism 130 and the transmitter focusing lens 140, and the transmitter focusing lens 140 and the optical fiber 150. This is also true in the case of optical reception where the light source 110 is replaced with the photodiode 190.

In other words, in order for the optical transmitter or the optical receiver to operate normally, four individual alignment factors need to be under sophisticated control. Further, time-consuming processes need to be eliminated to allow for mass production of optical assemblies.

Accordingly, a compact optical assembly is necessary which enables a sophisticated and easy alignment of an optical assembly in optical transceivers for optical communications while allowing a passive alignment of the optical assembly without requiring expensive equipment or a time-consuming process.

SUMMARY

In accordance with some embodiments, the present disclosure provides an optical assembly for optical transmission and reception, including a body assembly and a cover assembly. The body assembly includes a reflection prism configured to change a traveling direction of light traveling in a first direction in a Cartesian coordinate system to a second direction, a first lens disposed between at least one optical element and the reflection prism to optically couple the at least one optical element with the reflection prism, and a body hole vertically formed at a position spaced apart from the reflection prism by a predetermined distance. The cover assembly includes a cover post configured to be inserted into the body hole, a second lens configured to be disposed on one surface of the cover post so as to optically couple the reflection prism with an optical fiber, and a cover configured to mate with an upper portion of the reflection prism and an upper portion of the cover post so as to cover and protect an end of the body hole and an end of the optical fiber. The cover assembly and the body assembly, when assembled and coupled together, form an optical path extending along the at least one optical element, the first lens, the reflection prism, the second lens, the cover post and the optical fiber.

BRIEF DESCRIPTION OF THE DRAWINGS

FIGS. 5A, 5B and 5C are diagrams of a body assembly included in an optical transceiver assembly according to at least one embodiment of the present disclosure.

FIGS. 6A, 6B and 6C are diagrams of a cover assembly included in an optical transceiver assembly according to at least one embodiment of the present disclosure.

FIGS. 7A, 7B and 7C are diagrams of a body assembly and a cover assembly as coupled into an optical transceiver assembly according to at least one embodiment of the present disclosure.

Figure 1:
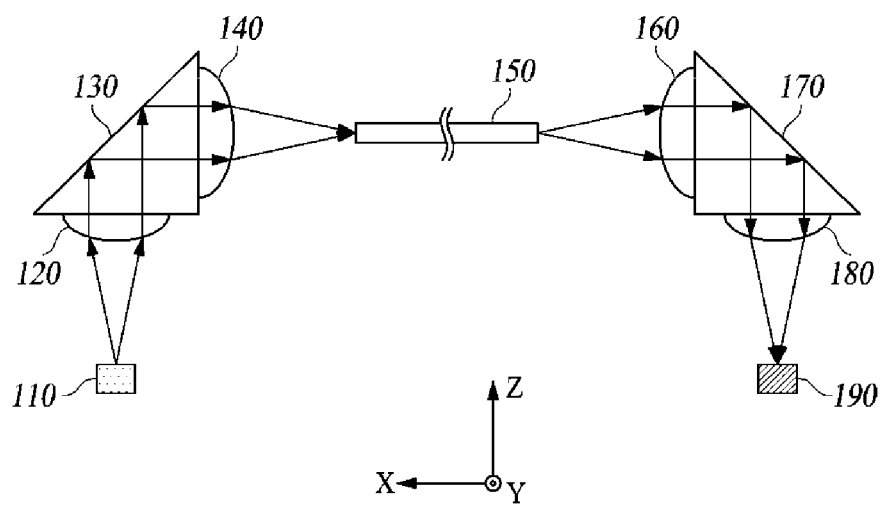
FIG. 1 is a schematic diagram of an optical system included in a conventional optical transceiver.

| REFERENCE NUMERALS | |
|---|---|
| 110, 210: light source | 120, 220: transmitter collimator lens |
| 130, 230: transmitter reflection prism | 140, 242: transmitter focusing lens |
| 150, 250: optical fiber | 152: core |
| 154: cladding | 160, 262: receiver collimator lens |
| 170, 270: receiver reflection prism | 180, 280: receiver focusing lens |
| 190, 290: photodiode | 240: transmitter focusing lens unit |
| 244: transmitter spacer | 260: |
| 264: receiver spacer | 310: cover assembly |
| 312: cover post | 314: transmitter focusing lens |
| 316: cover | 320: body assembly |
| 321: body hole | 323: transmitter collimator lens |
| 325: transmitter reflection prism | 326: optical fiber guide |
| 327: first post | 329: second post |
| 330: substrate | 350: optical fiber |
| 352: core | 354: cladding |
| 410: first baseline | 440, 450: body post |
| 460: body hole | 470: collimator lens |
| 480: focusing lens | 490: reflection prism |
| 500: body assembly | 510: optical fiber guide |
| 540: first post | 550: second post |
| 560: body hole | 570: collimator lens |
| 600: cover assembly | 620: cover post |
| 700: | 710: optical fiber guide |
| 740: first body post | 750: second body post |
| 760: body hole | 770: collimator lens |
| 780: focusing lens | |

DETAILED DESCRIPTION

Embodiments of the present disclosure seek to provide a compact optical assembly that can be used in optical transceivers that enable high capacity optical transmission.

Embodiments of the present disclosure seek to provide an optical transceiver that can be mass-produced at a reasonable price.

Hereinafter, some embodiments of the present disclosure will be described in detail with reference to the accompanying drawings. In the following description, like reference numerals designate like elements, although the elements are shown in different drawings. Further, in the following description of the at least one embodiment, a detailed description of known functions and configurations incorporated herein will be omitted for the purpose of clarity and for brevity.

Additionally, various terms such as first, second, A, B, (a), (b), etc., are used solely for the purpose of differentiating one component from the other but not to imply or suggest the substances, the order or sequence of the components. Throughout this specification, when a part "includes" or "comprises" a component, the part is meant to further include other components, not excluding thereof unless specifically stated to the contrary.

Hereinafter, some embodiments of the optical transceiver assembly of the present disclosure will be described with reference to the accompanying drawings. Further, for the sake of more clear explanation, the description will be provided with reference to the Cartesian coordinate system defined in x direction, y direction and z direction.

Figure 2:
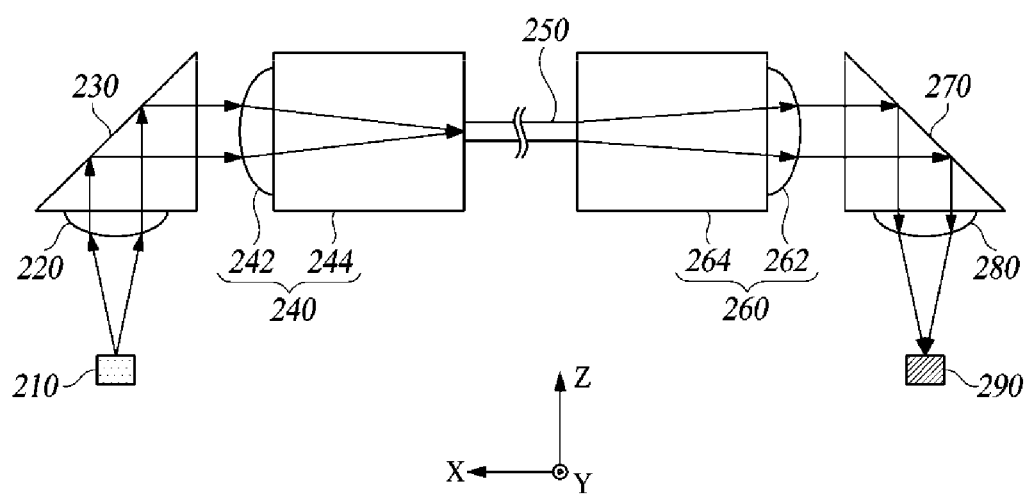
FIG. 2 is a schematic diagram of an optical system included in an optical transceiver according to at least one embodiment of the present disclosure.

FIG. 2 is a schematic diagram of an optical system included in an optical transceiver according to at least one embodiment of the present disclosure.

The components of the optical system included in the optical transceiver according to at least one embodiment of the present disclosure are similar to conventional optical systems but have fundamental structural differences. According to embodiments, an optical system included in an optical transceiver includes a transmitter collimator lens 220, a transmitter reflection prism 230, a transmitter focusing lens unit 240 and an optical fiber 250. Here, the transmitter focusing lens unit 240 includes a transmitter focusing lens 242 and a transmitter spacer 244.

The transmitter collimator lens 220 changes the light from the light source 210 to parallel light beams which it transmits to the transmitter reflection prism 230. The transmitter reflection prism 230 changes the path of the parallel light beams from the transmitter collimator lens 220 by 90° and sends them to the transmitter focusing lens 242. The transmitter spacer 244 may be provided with a thickness in the x-direction which corresponds to the focal length of the transmitter focusing lens 242, and thereby the light beams passing through the transmitter focusing lens 242 converge to the core of the optical fiber 250.

On the optical receiver side, the collimator lens and the focusing lens are functionally opposite to those lens of the optical transmitter. Hereinafter, an optical system including several individual functional elements will be referred to as an optical assembly.

Figure 3A:
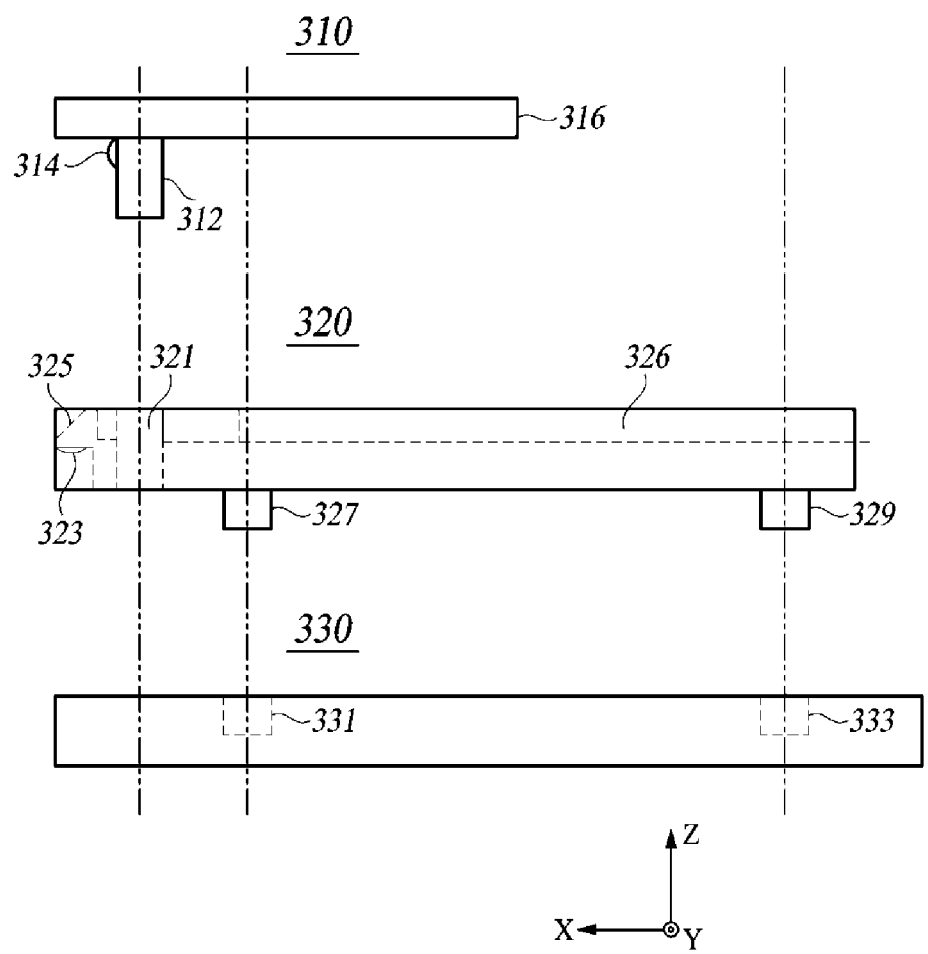
FIG. 3A is a side view of an optical transceiver assembly according to at least one embodiment of the present disclosure.

FIG. 3A is a side view of an optical assembly for optical transmission and reception according to at least one embodiment of the present disclosure.

An optical transceiver assembly according to at least one embodiment includes a cover assembly 310 and a body assembly 320.

Referring to FIGS. 2 and 3A, on the optical transmitter side, an optical assembly according to at least one embodiment of the present disclosure uses two lenses and one prism as in a conventional optical system, but it is formed in two parts of the body assembly 320 as one mechanical-optical system that includes a transmitter collimator lens 323, a transmitter reflection prism 325 and a transmitter optical fiber guide 326, and the cover assembly 310 as the other mechanical-optical system on which a transmitter focusing lens 314 is mounted. For a plan view of the transmitter optical fiber guide 326, one can refer to an optical fiber guide 510 shown in FIG. 5.

On the optical receiver side, the collimator lens and the focusing lens are functionally opposite to those lens of the optical transmitter.

In an optical assembly according to at least one embodiment, a printed circuit board 330 is provided with reference holes 331, 333, and the body assembly 320 is provided with posts 327, 329 that are directly coupled with the reference holes 331, 333, which enables highly reliable and efficient optical alignment between an optical element and the body assembly 320. Here, the optical element may include at least one light source 210 or photodiode 290.

The cover assembly 310 is coupled with the body assembly 320 to form an optical assembly which is mounted on the substrate 330 or other assembly. Subsequent to coupling the body assembly 320 with the substrate 330, the cover assembly 310 may be coupled with the body assembly 320.

Each of the cover assembly 310 and the body assembly 320 may be formed by using synthetic resin through injection molding or three-dimensional printing.

The substrate 330 may comprise a rigid printed circuit board made of a hard material and capable of supporting other parts as well as a flexible printed circuit board made of a soft material and capable of bending.

The substrate 330 may be mounted with at least one light source 210 or at least one photodiode 290 and a plurality of electronic components for driving thereof. In addition, various parts are mounted for high-capacity optical transmission.

Figure 3B:
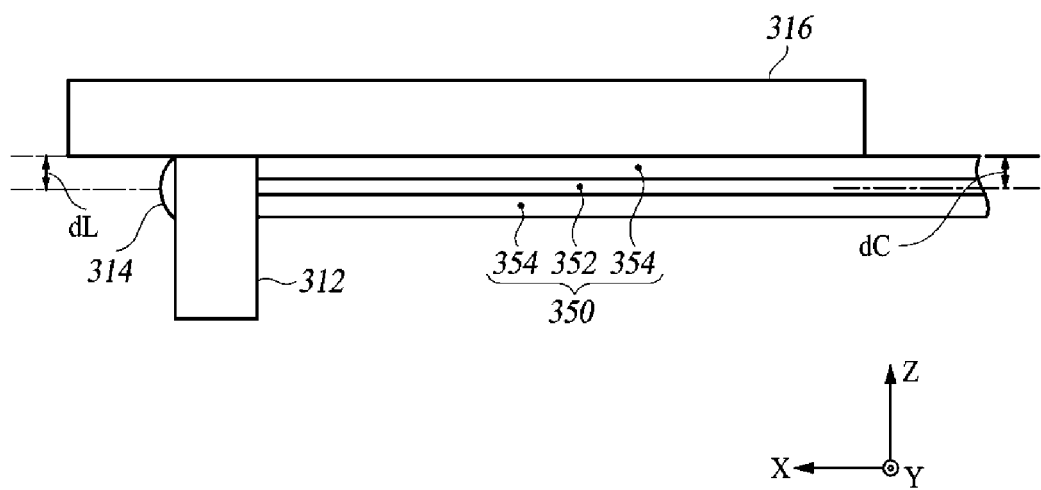
FIG. 3B is a side view of the optical transceiver assembly in FIG. 3A for illustrating the optical coupling thereof.

FIG. 3B is a side view for explaining the optical coupling of the optical assembly shown in FIG. 3A.

In FIG. 3B, the body assembly 320 is not shown for a more detailed explanation of the optical coupling between the cover assembly 310 and the optical fiber 350.

The optical fiber 350 has a core 352 and a cladding 354. The optical fiber 350 may be made of high-purity glass or synthetic resin. Typically, the core 352 is formed to have a refractive index larger than that of the cladding 354. With the larger refractive index of the formed core 352 than that of the cladding 354, the light incident on the core 352 of the optical fiber 350 is totally reflected at the boundary between the core 352 and the cladding 354 and thereby it can be transmitted over a long distance without being lost to the outside.

Although the core 352 and the cladding 354 have been described as having different discontinuous refractive index values, the optical fiber 350 may be formed to have a refractive index decreasing continuously from its center to the periphery. Additionally, the distribution of the refractive indices may change linearly around the core 352, and it may change sharply in the form of a quadratic curve.

In order to protect the core 352 and the cladding 354 from external impacts and damage, an outer skin may be further formed on the outside of the cladding 354.

The cover assembly 310 is designed so that distance dC from the center of the optical fiber 350 to the lower boundary surface of the cover 316 is the same as distance dL from the center of the lens 314 to the lower boundary surface of the cover 316.

Equalizing distance dL with distance dC allows simply placing the cover assembly 310 on the optical fiber 350 alone to inherently provide a vertical optical alignment between the center of the core 352 and the center of the lens 314.

Assuming a Cartesian coordinate system in which the cover post 312 is oriented in the z-direction and the axial direction of the optical fiber 350 is the x-direction, adjusting the thickness of the cover post 312 effects an optical adjustment between the lens 314 and the optical fiber 350 along one of their two horizontal directions (x-direction and y-direction), that is, an optical adjustment in the direction of the longitudinal axis of the optical fiber 350 on the drawing.

Alignment in the other direction of the two horizontal directions between the lens 314 and the optical fiber 350 depends on the width of the cover post 312, and where the width of the cover post 312 is made equal to that of the body hole 321, no optical adjustment is necessary in the other direction. Here, the cover post 312 serves the same function as the transmitter spacer 244 or the receiver spacer 264 as shown in FIG. 2. The cover post 312 has a width that is the same as the thickness of the transmitter spacer 244 or the receiver spacer 264 measured in the x-direction.

Although it is shown in FIGS. 3A and 3B that only one optical or fiber channel is formed, the optical transceiver assembly according to some embodiments of the present disclosure may include a plurality of fiber channels. Even if multiple fiber channels are formed, the basic operating principle for optical transmission and reception is the same as in the case of the single fiber channel.

Even when the optical transceiver assembly according to some embodiments of the present disclosure includes a plurality of fiber channels, it is not necessary to provide all the optical components by the number of channels. For both the optical transmitter and the optical receiver, it is suffice that first lenses 323, second lenses 314, and optical fiber guides 326 are respectively provided as many as the number of channels.

For example, with four fiber channels, the body assembly 320 included in the optical transceiver assembly according to some embodiments of the present disclosure is configured to have four first lenses, one reflection prism and four optical fiber guides. In this case, the cover assembly 310 may well be formed to include four second lenses. The optical transceiver assembly shown in FIG. 3A may be reconfigured to have four fiber channels by arranging four first lenses 323 instead of one, side by side in the y direction with reference to the predetermined position of one first lens 323 in the body assembly 320, arranging four second lenses side by side in the y direction with reference to the predetermined position of the second lens 314, and arranging four optical fiber guides side by side in the y direction with reference to the predetermined position in the body assembly 320 where the optical fiber guide 326 is formed. In this example, the case of four fiber channels has been described, but the number of fiber channels may be set within a range permitted by the sizes of the body assembly 320 and the cover assembly 310. Up to, for eight fiber channels may be formed.

Figure 4:
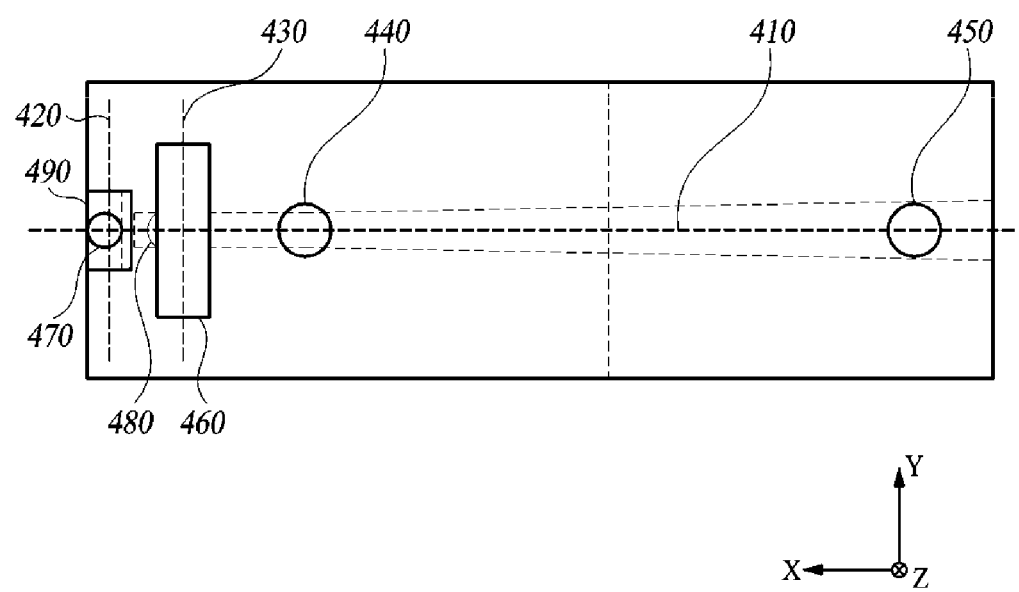
FIG. 4 is a plan view of a body assembly included in an optical transceiver assembly according to at least one embodiment of the present disclosure.

FIG. 4 is a plan view of a body assembly included in an optical assembly for optical transmission and reception according to at least one embodiment of the present disclosure.

The optical alignment between the optical fiber 350, the optical assembly and the optical elements as shown in FIGS. 3A and 4, is defined by a baseline 410 formed by the posts 327, 329 coincident with the reference holes 331, 333 of the substrate 330. This can be understood more accurately through the plan view of FIG. 4. A collimator lens 470, a reflection prism 490, a focusing lens 480 and two body posts 440, 450 are arranged along the base line 410, and a light source and an optical fiber (both not shown) are also placed and introduced along this baseline 410.

The baseline 410 serves as the basis for precisely aligning the body assembly 320, the lens 314 mounted on the cover assembly 310 and the optical fiber guide 326 formed on the body assembly 320. In particular, the light beams between the body assembly 320 and the cover assembly 310 are theoretically parallel to each other, and therefore the optical alignment and optical coupling between the assemblies are insensitive to dimensional variations between the assemblies.

The positions of the core 352 of the optical fiber 350 and the cover assembly 310 can be finely determined in relation to the dimensional deviation from the reference plane interlocked with the base line 410. Therefore, unlike the conventional optical system, the optical assembly according to some embodiments of the present disclosure, in which the optical fiber guide 326 is integrally formed with the body assembly 310, requires no additional optical fiber mechanism.

According to some embodiments of the present disclosure, the optical assembly brings the cover post 310 of the cover assembly 310 into contact with the optical fiber 350 with epoxy used for the process of fixing them together, whereby eliminating a possible contamination in the cut section of the optical fiber 350 and minimizing the difference in refractive index between the cut section of the optical fiber 350 and the cover post 312 to reduce the Fresnel loss. Utilizing the process described above, the optical assembly according to some embodiments of the present disclosure can maximize the efficiency of optical coupling.

Using the above described optical alignment structure and method, sophisticated setting is provided between the components of the optical transceiver according to embodiments of the present disclosure. This allows an optical alignment to be provided with high accuracy and easy cost-effectiveness without time-consuming processes, and such optical transceiver can be mass produced through a complete passive alignment without expensive equipment.

FIGS. 5A, 5B and 5C are diagrams of a body assembly included in an optical assembly for optical transmission and reception according to at least one embodiment of the present disclosure.

FIGS. 5A, 5B and 5C illustrate a body assembly 500 in plan view, side view and front view, respectively.

With an optical assembly for optical transmission, the body assembly 500 includes a collimator lens 570, a body hole 560, an optical fiber guide 510, a first body post 540 and a second body post 550.

An optical fiber (not shown) is introduced along the optical fiber guide 510 in the x direction from the right side of the body assembly 500.

The radiation angle of the light emitted from the light source varies depending on the geometry of the light source, the material constituting the light source, and the like. Assuming that the lens is not in use, typical vertical-cavity semiconductor laser has a radiation angle within a range of 10° to 30°.

When passing through the collimator lens 570, the light with a radiation angle between 10° to 30° is ideally converted to light with the radiation angle of 0°.

The body hole 560 is formed to penetrate the body assembly 500, and it accommodates a cover post 690 of a cover assembly 600 to be described below.

The optical fiber guide 510 has one end formed to be wide so as to facilitate insertion of the end of the optical fiber, and the other end designed to be the same as the width of the optical fiber so that the optical fiber is held against horizontal movements.

The depth of the optical fiber guide 510 is set so that the center of the optical fiber (not shown) disposed in the optical fiber guide 510 is at the same level as the center of a focusing lens 680 formed on the cover post 690. The depth of the optical fiber guide 510 is designed to be smaller than the general thickness of the optical fiber, that is, the outer diameter of the optical fiber.

The collimator lens 570, body hole 560, optical fiber guide 510, first body post 540 and second body post 550 may be formed as an integral structure by using processes such as injection molding or three-dimensional printing.

FIGS. 6A, 6B and 6C are diagrams of a cover assembly included in an optical assembly for optical transmission and reception according to at least one embodiment of the present disclosure.

FIGS. 6A, 6B and 6C illustrate the cover assembly 600 in plan view, side view and front view, respectively.

Referring to FIGS. 6A, 6B and 6C, the cover assembly 600 includes a cover 620, the cover post 690 and the focusing lens 680. The width of the cover 620 is the same as that of the body assembly 500, and the length of the cover 620 is shorter than that of the body assembly 500. The width and the thickness of the cover post 690 are formed to be the same as those of the body hole 560 formed in the body assembly 500. The height of the cover post 690 is formed to be smaller than that of the body assembly 500, in particular, the depth of the body hole 560.

The size of the cover post 690 in the y direction which is the post width and the size of the cover post 690 in the x direction which is the post thickness are determined to be the same as the width and the thickness of the body hole 560 formed in the body assembly 500, and therefore when the cover post 690 is attached to the body hole 560, the cover post 690 is fixed so as not to move in between two horizontal directions other than the vertical direction which is the insertion direction.

Referring to FIGS. 3B and 5 and 6 together, the depth of the optical fiber guide 510 is designed to be smaller than the outer diameter of the optical fiber (not shown). The smaller depth of the optical fiber guide 510 than the general thickness of the optical fiber maintains the optical fiber seated in the optical fiber guide 510 and slightly protruding over the upper boundary surface of the body assembly 500. With the height of the cover post 690 being smaller than the depth of the body hole 560, where the optical fiber is disposed in the optical fiber guide 510, the bottom surface of the cover 620 of the cover assembly does not reach the upper surface of the body assembly 500 but comes into contact with the uppermost portion of the optical fiber.

The height of the cover assembly 600 is not determined by the upper surface of the body assembly 500 but by the general thickness of the optical fiber, and thereby designing the cover assembly 600 alone achieves the alignment in the z direction between the center of the focusing lens 680 formed on one surface of the cover post 690 and the center of the optical fiber placed in the body assembly 500.

The cover 620, the cover post 690 and the focusing lens 680 included in the cover assembly 600 may be integrally formed by using processes such as injection molding or three-dimensional printing.

FIGS. 7A, 7B and 7C are diagrams of a body assembly and a cover assembly as coupled into an optical assembly for optical transmission and reception according to at least one embodiment of the present disclosure.

Referring to FIGS. 7A, 7B and 7C, it is confirmed that the cover 720 is coupled to the body assembly so as to protect the focusing lens 780, the body hole 760, the collimator lens 770 and some of the optical fiber.

A cylindrical first body post 740 is formed at a position separated by a first distance from the center of the body hole 760 along an imaginary line connecting between the collimator lens 770 and the center of the body hole 760. A cylindrical second body post 750 is located at a position separated by a second distance from the center of the body hole 760 along the imaginary line connecting between the collimator lens 770 and the center of the body hole 760.

The first body post 740 is inserted in a first fixing hole (not shown) of a substrate so that it is fixed against movements in the horizontal direction which is the x and y direction but it may rotate in place. This can be accomplished by designing the first body post 740 to have the diameter approximately the same as that of the first fixing hole.

The second body post 750 is fixedly inserted in a second fixing hole with a margin so that it can move in the horizontal direction to some extent. This can be achieved by designing the diameter of the second fixing hole slightly larger than the diameter of the second body post 750. When the diameter of the first body post 740 and the diameter of the second body post 750 are the same, the diameter of the first fixing hole will be larger than that of the second fixing hole. Alternatively, when the diameter of the first fixing hole and the diameter of the second fixing hole are the same, the diameter of the first body post 740 will be larger than that of the second body post 750.

As described above, once the substrate receives the first body post 740 at a position corresponding thereto so that it is fixedly against movements in the horizontal direction but rotates in place, and loosely receives the second body post 750 at another position corresponding thereto with an extra margin as compared to the first body post 740, the second body post 750 may move while drawing an arc about the first body post 740 within the range allowed by the second fixing hole.

The first body post 740 and the second body post 750 may also be coupled to other optical communication modules or systems including the substrate.

According to at least one embodiment of the present disclosure, alignment between optical elements which takes only a few passive optical alignments for providing aligned optical elements that have required multiple complex and sophisticated processes.

According to another aspect of at least one embodiment of the present disclosure, the optical transceiver necessary for high-capacity and high-speed optical transmission can be mass-produced at low cost.

According to yet another aspect of at least one embodiment of the present disclosure, alignment between a plurality of optical elements used in an optical transmitter or an optical receiver is easily achieved without expensive equipment or time-consuming processes.

Although exemplary embodiments of the present disclosure have been described for illustrative purposes, those skilled in the art will appreciate that various modifications, additions and substitutions are possible, without departing from the idea and scope of the claimed invention. The scope of the technical idea of the present embodiments is not limited by particular illustrations. Accordingly, one of ordinary skill would understand the scope of the claimed invention is not to be limited by the explicitly described above embodiments but by the claims and equivalents thereof.

What is claimed is:

1. An optical assembly for optical transmission and reception, comprising:
   a body assembly comprising:
      a reflection prism configured to change a traveling direction of light traveling in a first direction in a Cartesian coordinate system to a second direction,
      a first lens disposed between at least one optical element and the reflection prism to optically couple the at least one optical element with the reflection prism, and
      a body hole vertically formed at a position spaced apart from the reflection prism by a predetermined distance, the body hole is defined by a continuous sidewall of the body assembly; and
   a cover assembly comprising:
      a cover post configured to be inserted into the body hole, the cover post is received within the body hole such that the body hole entirely surrounds the cover post and closely abuts the cover post to restrict movement of the cover post away from the reflection prism in a common plane with the reflection prism,
      a second lens configured to be disposed on one surface of the cover post so as to optically couple the reflection prism with an optical fiber, and
      a cover configured to mate with an upper portion of the reflection prism and an upper portion of the cover post so as to cover and protect an end of the body hole and an end of the optical fiber,
   wherein the body assembly further comprises an optical fiber guide configured to extend from one end of the body assembly to the body hole for accommodating the optical fiber, wherein a depth of the optical fiber guide is shallower than a diameter of the optical fiber, and a height of the cover post is shorter than a depth of the body hole such that, when the cover assembly and the body assembly are assembled and coupled together, the optical fiber accommodated in the optical fiber guide is in contact with one surface of the cover post and the cover post is supported by the optical fiber, wherein a distance from a center of the optical fiber to a lower boundary surface of the cover is the same as a distance from a center of the second lens to the lower boundary surface of the cover such that placing the cover assembly on the optical fiber accommodated in the optical fiber guide of the body assembly provides vertical optical alignment between a center of a core of the optical fiber and the center of the second lens, wherein the cover post has a thickness equal to the focal length of the second lens so that light beams passing through the first lens converge to the core of the optical fiber, and wherein the cover assembly and the body assembly, when assembled and coupled together, form an optical path extending along the at least one optical element, the first lens, the reflection prism, the second lens, the cover post and the optical fiber.

2. The optical assembly of claim 1, wherein the cover post, when inserted into the body hole, is fixed so as not to move in two horizontal directions perpendicular to an insertion direction in which the cover post is inserted into the body hole.

3. The optical assembly of claim 1, wherein the second lens is disposed at a point of the cover post, which provides a maximum optical coupling efficiency between the optical fiber and the second lens.

4. The optical assembly of claim 1, wherein the optical fiber guide is configured to have a varying width which is larger than a general width of the optical fiber at one end of the body assembly and is the same as the general width of the optical fiber at the body hole.

5. The optical assembly of claim 1, wherein the first lens, the reflection prism, the optical fiber guide and the body hole are integrally formed by injection molding.

6. The optical assembly of claim 1, wherein the reflection prism is configured to form one optical path between the first lens and another optical path between the optical fiber so that the one optical path is orthogonal to the another optical path, and thereby allowing light emitted from the first lens to travel along the optical fiber and allowing light emitted from the optical fiber to be incident on the at least one optical element through the first lens.

7. The optical assembly of claim 1, wherein the body assembly is formed with a first body post and a second body post which are cylindrical on a virtual straight line extending from the first lens past the second lens when viewed from above down to the body assembly at a first position spaced from a center of the body hole by a first distance and at a second position spaced from the center of the body hole by a second distance, respectively.

8. The optical assembly of claim 7, wherein the body assembly is configured to have the first body post received in a substrate by a first fixing hole formed in a position corresponding to the first body post so that the first body post is fixed against movements in the horizontal direction but rotates in place, and to have the second body post received in the substrate by a second fixing hole formed in another position corresponding to the second body post so that the second body post is allowed to move while drawing an arc about the first body post.

9. The optical assembly of claim 1, further comprising multiples of the first lens, the second lens and the optical fiber guide, respectively, wherein the number of first lenses, second lenses and optical fiber guides is the same as the number of the at least one optical element, and wherein the first lenses, the second lenses and the optical fiber guides are respectively formed in parallel in a third direction perpendicular to both of the first direction and the second direction so as to be optically coupled with each of the at least one optical element.

* * * * *